Figure 1:
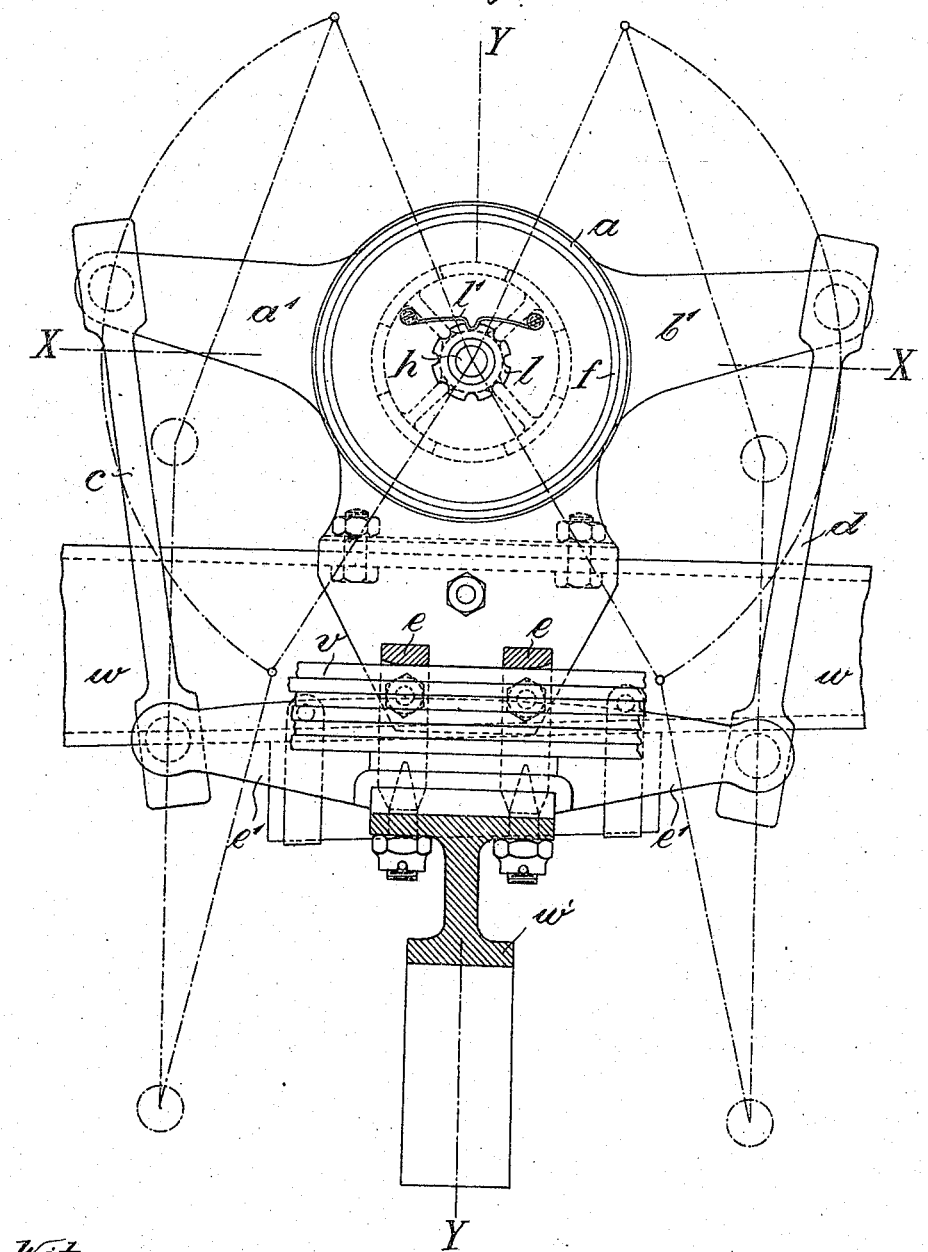

No. 881,252. PATENTED MAR. 10, 1908.
W. MAYBACH.
DEVICE FOR THE RELIEF OF WAGON SPRINGS.
APPLICATION FILED MAR. 15, 1907.
3 SHEETS—SHEET 2.
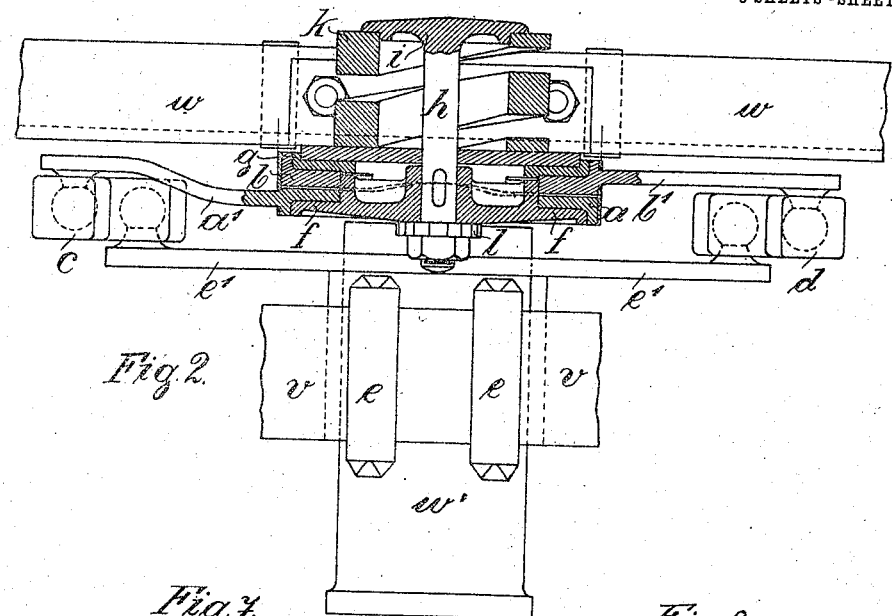
Fig. 2.
Fig. 7.
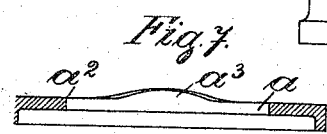
Fig. 4. Fig. 6. Fig. 5.
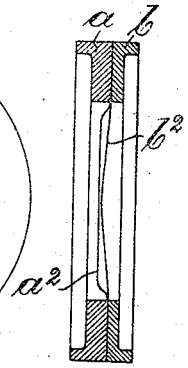
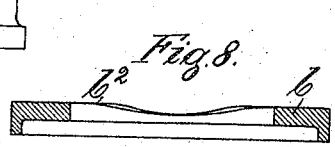
Fig. 8.
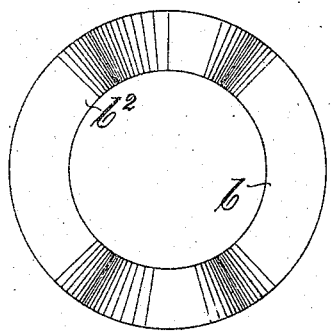
Fig. 9.
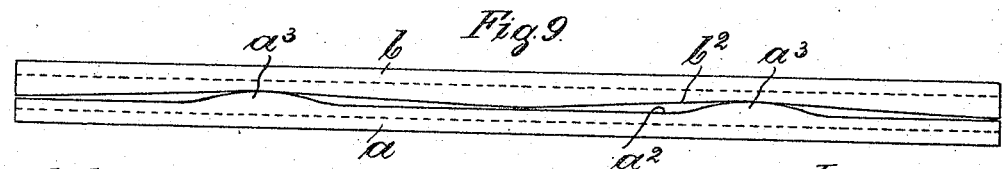
Witnesses:
Carl Ruff
Emil Kayser
Inventor:
Wilhelm Maybach.
by Robert Ziegler
Attorney.

No. 881,252. PATENTED MAR. 10, 1908.
W. MAYBACH.
DEVICE FOR THE RELIEF OF WAGON SPRINGS.
APPLICATION FILED MAR. 15, 1907.
3 SHEETS—SHEET 3.
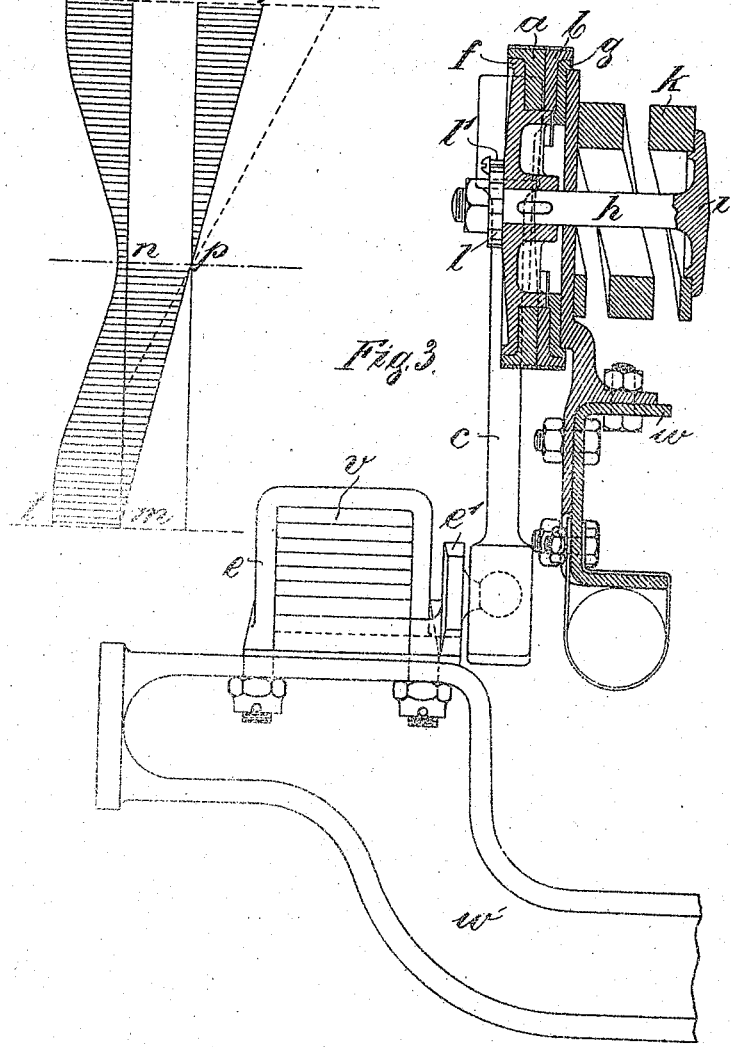

UNITED STATES PATENT OFFICE.

WILHELM MAYBACH, OF CANNSTATT, GERMANY, ASSIGNOR TO DAIMLER MOTORENGESELL-SCHAFT, OF UNTERTÜRKHEIM-STUTTGART, GERMANY.

DEVICE FOR THE RELIEF OF WAGON-SPRINGS.

No. 881,252.  Specification of Letters Patent.  Patented March 10, 1908.

Application filed March 15, 1907. Serial No. 362,481.

*To all whom it may concern:*

Be it known that I, WILHELM MAYBACH, a subject of the King of Würtemberg, and resident of 9 Freiligrathstrasse, Cannstatt, in the Kingdom of Würtemberg, German Empire, engineer, have invented certain new and useful Improvements in Devices for the Relief of Wagon-Springs, of which the following is an exact specification.

Many devices have been employed for the purpose of taking up shocks or jolts caused by uneven and rough roads, relieving thereby the wagon springs and preventing a transmitting of such shocks upon the wagon box. But most of these devices showed a certain defect in as much as wagon springs with attached devices were subjected to higher stresses than those springs without them. In other cases these devices were so constructed as to give way even to the smallest jolts, which faulty constructions take the spring cushioning out of the wagon box to a great extent, besides putting unnecessary stress upon the pneumatic tires.

The present invention deals with a device that combines the properties of a soft spring cushioned bed with those of a catcher of all shocks and jolts imparted to the vehicle during fast driving over rough roads. In order to accomplish this, the device consists of properly constructed friction disks which in connection with the wagon-springs take up all jolts and shocks so that the impacts are equally divided between the wagon-springs and the device attached to them. Wagon springs with such an attached device need not be so strong and may receive twice the amount of resiliency than springs without such an attachment. These disks partially provided with even and partially with uneven friction surfaces, are placed side by side and pressed against each other by means of a strong spring coil. As soon as a jolt or shock occurs, this impact is transmitted to those disks and their relation to each other in regard to their first position is changed in as much as they are more or less turned around their axis, but the pressure enacted by one of the shifted disks upon the surface of the other one next to it does not increase in proportion with the strength of the single blows upon the wagon-springs, as was the case in all former devices, but this pressure is a rather small one at the beginning of the blow and increases quite considerable towards the end of same. A good constructional form of such a device consists of two disks provided with surfaces rising and falling like waves, which disks are pressed against each other by means of a strong spring coil and which are connected to the wagon springs by suitable rods and plates in such a way that a vibration of the wagon spring will cause a concentric turn of these disks, by means of which turns the relative positions of those disks to one another are changed and a compression of the spring coil is achieved, in as much as the distance or space between two adjacent disks is increased due to the shifting of these uneven surfaces thereon, whereby the elevated parts of one surface—normally opposite the dented parts of the adjacent surface—come opposite the elevated parts of the latter surface. During this manipulation more or less friction has to be overcome and this work accomplished by the disks absorbs the forces enacted by those shocks and jolts and prevents their transmitting themselves to the wagon box. In order to take up these more or less heavy shocks by the disks in the proper proportions, the surface of one disk must have a wavelike form, whereas the surface of the other disk facing this one must be even, but provided with some elevations, which elevated parts should be situated opposite the deeper or dented portions of the other disk.

In order to make the invention better understood, same is accompanied by drawings which show a constructional form of the device by way of example.

Figure 1 represents a front view of the device. Fig. 2 is a section cut through lines X—X. Fig. 3 is a section through lines Y—Y. Figs. 4 and 5 represent face views of the friction disk surfaces. Figs. 6, 7 and 8 are sectional side views of those disks. Fig. 9 represents the curved surfaces of the two friction disks sides if rolled off in a plane. Fig. 10 illustrates in form of a diagram the forces acting upon the device while in operation.

The two friction disks $a$ and $b$ are each provided with a side arm $a'$ and $b'$, which arms are pivotally connected with projections $e'$ of the wagon spring holder $e$ by means of two connecting rods $c$ and $d$. The main shaft $h$ on which those two disks turn is firmly attached to the upper or carriage frame $w$, whereas the spring holder $e$ is affixed to the lower part or axle frame $w'$. Two other disks $f$ and $g$ are placed one on each side of the friction disks $a$ and $b$, which end plates are concentrically turned to a certain degree by the friction disks. All four disks are held together by the bolt $h$, the head $i$ of which is shaped like a saucer in order to serve as a receptacle for the one end of the spring coil $k$. The other end of this coil rests against disk $g$ and by means of the spring force of this coil the four disks $a$ and $b$, $f$ and $g$ are pressed closely together. The friction between these disks can be regulated by tightening or loosening the nut $l$ at the other end of bolt $h$. The nut $l$ is provided with a suitable interlocking device $l'$.

The surfaces of the disks $f$ $a$ and $b$ $g$ are smooth and even but the inner surfaces $a^2$ $b^2$ of the disks $a$ $b$ facing each other are formed in a wavelike manner. Now if those two disks $a$ and $b$ are turned, the elevated parts of the surfaces being shifted and coming opposite one another will cause a separating of the disks $a$ and $b$, whereby the space between the wave surfaces $a^2$ $b^2$ is increased and the spring coil $k$ will be compressed to a certain extent. Such a turning or shifting of the two disks $a$ and $b$ takes place every time the wagon spring $v$ receives a blow caused by a jolt on the driving wheels, in as much as the vibration of the spring $v$ is transmitted to those friction disks $a$ $b$ by means of the two connection rods $c$ $d$ attached to projections $e'$ of spring holder $e$ and side arms $a'$ $b'$ of the disks. The turning or displacement of the two disks $a$ $b$ becomes the larger, the greater the shock or jolt upon the driving wheel, and the compression of the spring coil $k$ by means of those two disks $a$ $b$ will increase accordingly.

In order to avoid too great a spring compression by every small jolt the surface $b^2$ of the disk $b$ is evenly curved or waved whereas the surface $a^2$ of the other disk $a$ facing this waved surface $b^2$ is made even and provided with certain elevations $a^3$. In their normal positions these elevations $a^3$ are placed opposite the deep or dented portions of the other disk surface $b^2$ whereas the highest parts of this curved surface $b^2$ are opposite the even and lowest parts of the surface $a^2$ of the other disk as is shown in Fig. 9. Thus a small shock will cause a little turn of the disks, the space between them will increase very little and accordingly the spring coil compression will be likewise a small one, but as soon as those disks are turned to a larger degree by stronger shocks, the space between the disks will be increased to a greater extent by those uneven surfaces of the disks and consequently the spring coil $k$ will be compressed to a considerably higher degree.

The increase and the decrease of the working forces acting on this device are illustrated by a diagram in Fig. 10. Here the straight line $m$ $n$ represents the action of the spring coil from $o$ up to normal, and $n$ $o$ is the one from normal up to maximum whereas $n$ $p$ represents the normal and $o$ $q$ the maximum spring load. Thus the triangle $p$ $u$ $r$ represents the work to be accomplished by the wagon spring if subjected to the strongest jolt while in its normal position and under normal load. Now the object of the present device is to prevent too great an enlargement of this work. The work represented by triangle $p$ $q$ $u$ has to be taken up by the device but the actual work taken up by this device is represented in the diagram by $n$ $o$ $s$. The contents of this plane represents almost the same as that of triangle $p$ $q$ $r$. The curved side $n$ $s$ of the plane $n$ $o$ $s$ corresponds with the conditions under which the stress is delivered, beginning with a small force which increases later on to a much higher degree at about half way between the points $n$ and $s$ and remains constant towards the end $s$, in fact it may decrease somewhat towards that end, which is done for the purpose of providing for a smooth driving on good roads and preventing too strong an end stress $o$ $q$, the latter also representing the maximum stress on the pneumatic tires. In as much as the plane $n$ $o$ $s$ represents friction work which is not repeated on the return path of the disks, the spring coil force, as represented by triangle $p$ $q$ $r$ comes in action as a retroactive force, but this force is counteracted by the friction work of the disks which in their return path are pressed against each other by this coil and thus the two forces absorb themselves and are annulled thereby. If suddenly an unloading of the wagon springs should take place the work of same represented by $m$ $n$ $p$ is counteracted by a friction work $m$ $n$ $t$ and absorbed. As will be observed by the above, the present arrangement of such a device will prevent a repeated swinging and vibrating of the wagon springs in an up and down direction and instead of having the impacts received absorbed by these repeated swingings or vibrations of the springs and wagon box, these forces are annulled at their very beginning by the friction of the disks provided for. If this device was left off the wagon spring would have to take up the work represented by $n$ $o$ $s$ in the diagram besides, thus to triangle $p$ $q$ $r$ another triangle $p$ $q$ $u$ would have to be added, the contents of the latter representing those of the plane $n$ $o$ $s$. In other words the wagon spring would have to be made twice as strong in order to take up the work added to the same.

Having thus fully described the nature of my invention, what I desire to secure by Letters Patent of the United States is:—

1. In a device for the relief of wagon-springs the combination of several disks placed side by side and revolving around an axis firmly attached to the carriage frame, the friction surfaces of which disks have a wave-like form and are pressed against one another by an adjacent spring coil, each disk being attached by suitable projecting arms and connection rods to the spring holder of the main wagon spring on the axial frame, so that each friction disk is shifted under increased spring pressure and thereby enlarged frictional resistance of the friction surface at a ratio of but a slight increase at the start and during the first part of the disks movements, but with a considerable increase towards the end position of the whole disk travel.

2. A device for the relief of wagon springs consisting of two disks $a$ and $b$, arranged side by side and pressed against each other by means of a spring coil $k$, said disks revolving concentrically around one shaft or axis $h$, firmly attached to the carriage frame $w$, said disks being provided with friction surfaces bearing upon one another in a wave-like form, the auxiliary washers $f$ and $g$ placed on each side of disks $a$ and $b$, each disk $a$ and $b$ being attached to the spring holder $e$ of the main wagon spring $v$ on the axle frame $w'$ by means of side arms $a'$ $b'$ and connection rods $c$, $d$ and projecting holder arms $e'$, so that each friction disk is shifted under increased spring pressure and thereby enlarged frictional resistance of the friction surfaces at a ratio of but a slight increase at the start and during the first part of the disks movements but with a considerable increase towards the end-position of the whole disk travel.

3. A device for the relief of wagon-springs consisting of two disks $a$ and $b$ placed side by side and pressed against each other by means of a spring coil $k$, said disks revolving concentrically around one shaft or axis $h$, firmly attached to the carriage frame $w$, said disks being provided with peculiar shaped friction surfaces, of which the surface $b^2$ of the disk $b$ is curved in form of waves, whereas the surface of disk $a$ next to the one of disk $b$ is even but provided with elevated portions $a^3$, said elevations being under normal conditions situated opposite the deep or dented parts of the surface $b^2$ of disk $b$, each disk $a$ and $b$ being attached to the spring holder $e$ of the main wagon spring $v$ on the axle frame $w'$ by means of side arms $a'$ $b'$ and connection rods $c$, $d$ and projecting holder arms $e'$, so that each friction disk is shifted under increased spring pressure and thereby enlarged frictional resistance of the friction surfaces at a ratio of but a slight increase at the start and during the first part of the disks movements, but with a considerable increase towards the end-position of the whole disk travel.

In witness whereof I have hereunto set my hand in the presence of two witnesses.

WILHELM MAYBACH.

Witnesses:
ROBERT UHLAND,
KARL KEPLER.